United States Patent [19]

Scribe

[11] Patent Number: 5,179,522
[45] Date of Patent: Jan. 12, 1993

[54] SCANNING METHOD AND APPARATUS FOR AN INSERTER

[75] Inventor: Mark A. Scribe, Southbury, Conn.
[73] Assignee: Pitney Bowes Inc., Stamford, Conn.
[21] Appl. No.: 535,254
[22] Filed: Jun. 7, 1990
[51] Int. Cl.[5] .............................................. G06F 15/46
[52] U.S. Cl. .................................... 364/478; 355/308; 271/8.1; 271/265
[58] Field of Search ................ 364/478; 271/8.1, 264, 271/265; 270/32, 45, 46; 355/308, 317, 323

[56] References Cited

U.S. PATENT DOCUMENTS

| | | | |
|---|---|---|---|
| 4,942,535 | 7/1990 | Francisco | 364/478 |
| 4,970,654 | 11/1990 | Francisco | 364/478 |
| 4,992,950 | 2/1991 | Francisco | 364/478 |
| 5,003,485 | 3/1991 | Francisco | 364/478 |

Primary Examiner—Jerry Smith
Assistant Examiner—Paul Gordon
Attorney, Agent, or Firm—Charles R. Malandra, Jr.; Melvin J. Scolnick

[57] ABSTRACT

A document feeding system and method, such as an inserting apparatus and method, wherein marks read from control document or other documents are employed to control the operation of the system. The data read from the documents is stored in a buffer, and the direction of read-out of the buffer may be changed, for example under operator control, in order to adapt the system to control by a plurality of formats of the control marks.

10 Claims, 3 Drawing Sheets

SCANNING METHOD AND APPARATUS FOR AN INSERTER

FIELD OF THE INVENTION

This invention relates to a method and apparatus for controlling an inserter of the type that is employed, for example, in assembling material to be inserted in an envelope for mailing. It will be apparent, of course, that the invention is not limited to such end use.

BACKGROUND OF THE INVENTION

The operations of inserting machines, for inserting one or more documents into an envelope, can be controlled by the provision of coded marks printed on the document, the marks being adapted to be read by the inserter. The reading of the marks may be effected optically. For example, the marks may indicate to the inserter that the current document is the first sheet of a collation, the end of a collation (EOC) etc.

In one marking system, the coded marks are preceded, in the direction of movement of the document, by a "benchmark", so that the position of a mark with respect to the benchmark determines its control function. Another type of marking system, however, employs a benchmark situated to be read in the reverse order of first above discussed system. Typically, an inserter system is dedicated to handling control marks for only one marking systems.

U.S. Pat. No. 4,527,468, Piotroski, and U.S. Pat. No. 4,707,790, Gomes, et al, disclose in inserting apparatus and equipment wherein one or more modules are provided to feed documents, for example from webs of computer print-out forms, to a transport unit. Typically, control marks provided on control documents processed by the module are read at a scanning station in the module to provide control and other information for the inserter system. The control marks may also, or alternatively, be provided on other than control documents.

U.S. Pat. No. 4,362,928, Sheldon, discloses a coded document actuated device wherein the document itself carries a character that identifies the format that is to be employed for the remainder of the code of the document. The format character controls the decoding of the data characters that are read from a data buffer. This system, which is not concerned with inserters, is only controlled to decode the data, and is limited to a single format of the data.

U.S. Pat. No. 4,812,982, PeBenhofer, discloses a conveying system with branches for directing objects in different paths, wherein code marks determine the direction of branching of objects. The system is adaptable only to the use of coding information of one format.

SUMMARY OF THE INVENTION

The invention is directed to the provision of a system enabling controlling of the inserter by marks of more than one format.

Basically, in accordance with the invention, control and identification marks are scanned and clocked into a buffer, using an encoder as the clocking signal. The encoder timing at the time of occurrence of a pulse resulting from reading of a mark thus provides an indication of the meaning of the mark. The stored marks are then sequentially read out of the buffer for control of the inserter.

A control switch or the like is provided to control the direction in which the buffer is read out, in order to permit control by different mark formats, as well as to enable the program of the system to interpret of the meanings of the marks.

Briefly stated, in accordance with one embodiment, the invention provides a document feeding system of the type having means for feeding one or more documents having coding and/or information marks thereon, means for detecting the marks, means coupled to receive the output of the detecting means, and means for controlling the operation of the document feeding system in response to the receipt of the output of the detecting means. In accordance with the invention, the means for receiving the output of the detecting means comprises buffer means, and the controlling means comprises means for selectively changing the direction of read-out of data stored in the buffer means, and means for controlling the document feeding system in accordance with data read out of the buffer means.

The means for controlling the document feeding system preferably controls the document feeding system in accordance with the read-out data only after the read-out of the buffer means.

The document feeding system may constitute an inserting system of the type having one or more modules for feeding one or more documents having coding and/or information marks thereon, each of the modules comprising means for detecting the marks and means for controlling the operation of the respective module.

The means for changing the direction of read-out of the buffer means preferably comprises operator controllable means for selectively controlling the direction of read-out of the buffer means.

Further, in accordance with the invention, it is preferable that the data be clocked into the buffer means under the control of the controlling means, and that the validity of the data stored in the buffer means be determined only after the data is stored into the buffer means.

The invention further comprises a method for controlling a document feeding system of the type having means for feeding one or more documents having coding and/or information marks thereon, means for detecting the marks, means coupled to receive the output of the detecting means, and means for controlling the operation of the document feeding system in response to the receipt of the output of the detecting means. In accordance with the method of the invention, data from the detecting means is directed to a buffer means, the direction of read-out of the buffer means is changeable, and the document feeding system is controlled in accordance with data stored in the buffer means only after reading-out the buffer means.

The step of changing the direction of read-out may comprise changing the read-out of the buffer means for first-in-first-out to last-in-first-out, or it may comprise changing the direction of read-out of the buffer means from last-in-first-out to first-in-first-out.

BRIEF DESCRIPTION OF THE DRAWING

In order that the invention may be more clearly understood, it will now be disclosed in great detail with reference to the accompanying drawing, wherein.

DETAILED DISCLOSURE OF THE INVENTION

Figure 1:
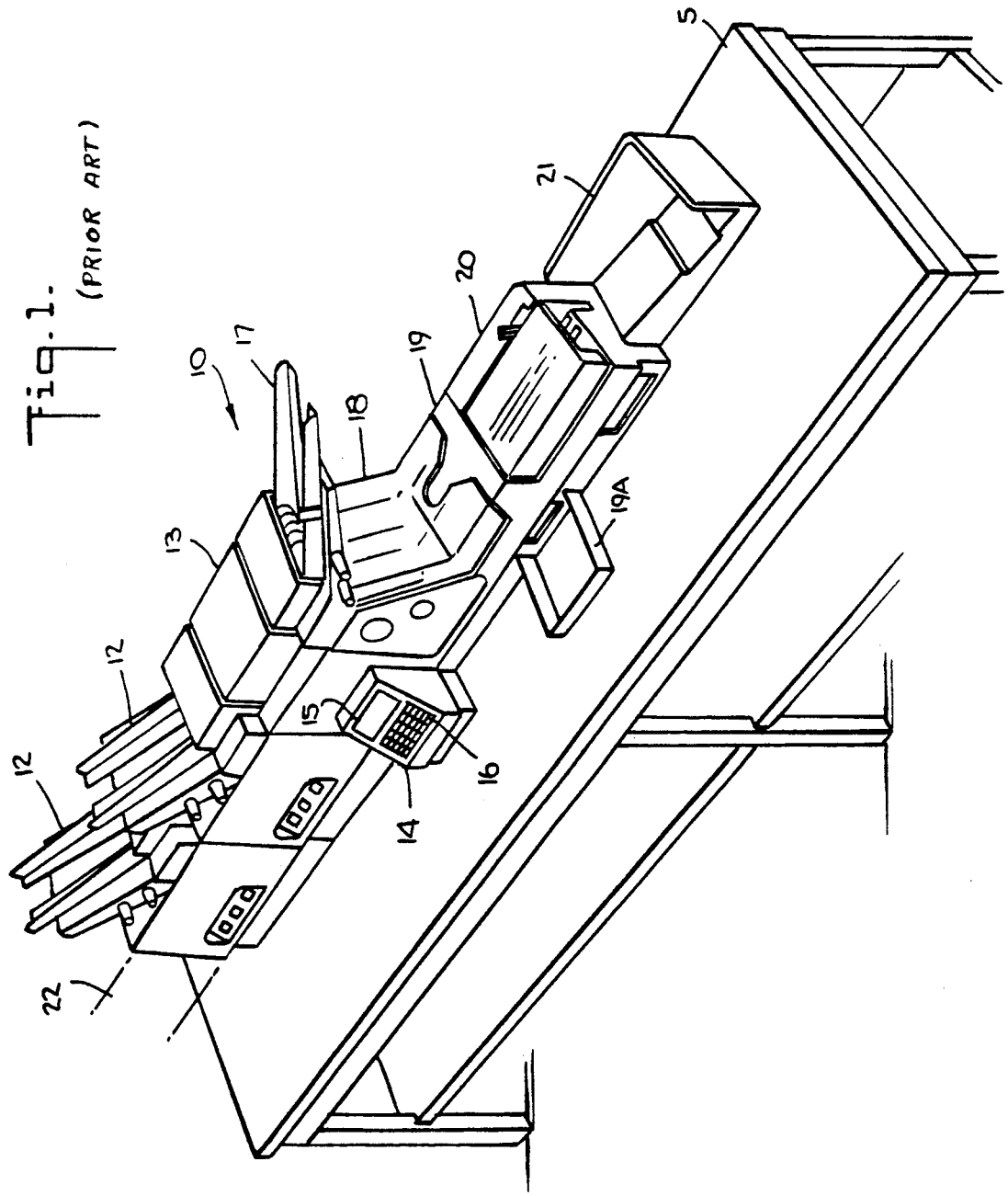
FIG. 1 is a perspective view of one form of apparatus that may incorporate the present the invention.

FIG. 1 of the drawings show a perspective view on a table 5 of the machine 10 incorporating the present invention. Machine 10 includes two document feeding stations 12, feeding station keyboard for data entry 12a, a transport station 13, electronics control station 14, with associated message display screen 15 and data keyboard 16, an envelope feeding station 17, an envelope stuffing station 18, a turning and ejection station 19, a moistener and sealing station 20, and a stacking station 21. This system is described in greater detail in U.S. patent application Ser. No. 292,157 filed Dec. 30, 1988, assigned to the assignee of the present application, the contents of which are incorporated herein by reference. Although only two document feeding stations are shown, it will be appreciated that may more feeding stations can be added on to the front end of the machine, which has been indicated by the dashed lines 22 shown at the left end, and the operation of the overall machine does not change. These modules may also include bursting, folding modules and other types of document feeders. The keyboard 14 is used to provide operator input as to start, operating instructions, reset functions and the like. The display 15 is employed to show error messages, module status, echo keyboard instructions and the like. It will be understood that the present invention can be incorporated into other inserters for example, console inserters such as the 8300 series inserters manufactured by the assignee of the present invention.

The following detailed description will be more understandable with the brief description of the underlying concepts and operation of the machine now outlined. Each feeding station is independent of other feeding stations and its operation is controlled by a local microcontroller. Each feeding station, of which one or more may be included in the machine, is typically provided with a hopper for storing a stack of documents, and a plurality of scanners or sensors connected to its local microcontroller for controlling the feeding of one or more of its documents to the global collation, and signalling the receipt and departure of the global collation. Each feeding station contains a queuing station for temporarily capturing and holding the global collation When the queuing station of the current feeding station is empty, its local microcontroller is signaled and deposits into its local queuing station the one or more documents it is instructed to contribute. This instruction may come manually from an operator through the keyboard located on the side of the feeder, be programmed into the local microcontroller through the base unit keyboard, or be derived from a coded address document, typically the top document of the collation, which has been read by a scanner at an upstream feeding station and the information passed on to the local feeding station. When the local contribution is completed, the upstream microcontroller is signaled to send down the so-far accumulated global collation, which is accomplished by opening a gate at the previous queuing station and activating a feeder mechanism which then deposits the global collation on top of the local contribution at the current queuing station. This process, it will be noted, ensures that an address document, previously on top of the collation, remains on top at the current queuing station. Each local microcontroller is passed in turn a collation record, which records the documents contributed to the global collation, and each microcontroller in turn updates the collation records and passes it downstream to the next feeding station, or, if the last, to the envelope stuffing station. When the global collation is completed at the current feeding station, the next downstream feeding station or envelope stuffing station is informed. The global collation remains at the current queuing station until the next downstream station is ready to receive the global collation. This is the basis for the on-demand feeding table, which is essentially an asynchronous operation in which local stations control the collation feeding while within the local domain, i.e., its local queuing station. There is also a main computer or microcontroller which can communicate with each of the stations in the machine, but the collation record is transferred directly from local microcontroller to local microcontroller, instead of via the main computer. The operation of the envelope stuffing station is similarly locally controlled by the state of the immediately upstream feeding station, except that any defects in the collation records passed on to it will result in ejection of that stuffed enveloped from the main flow path.

Figure 2:
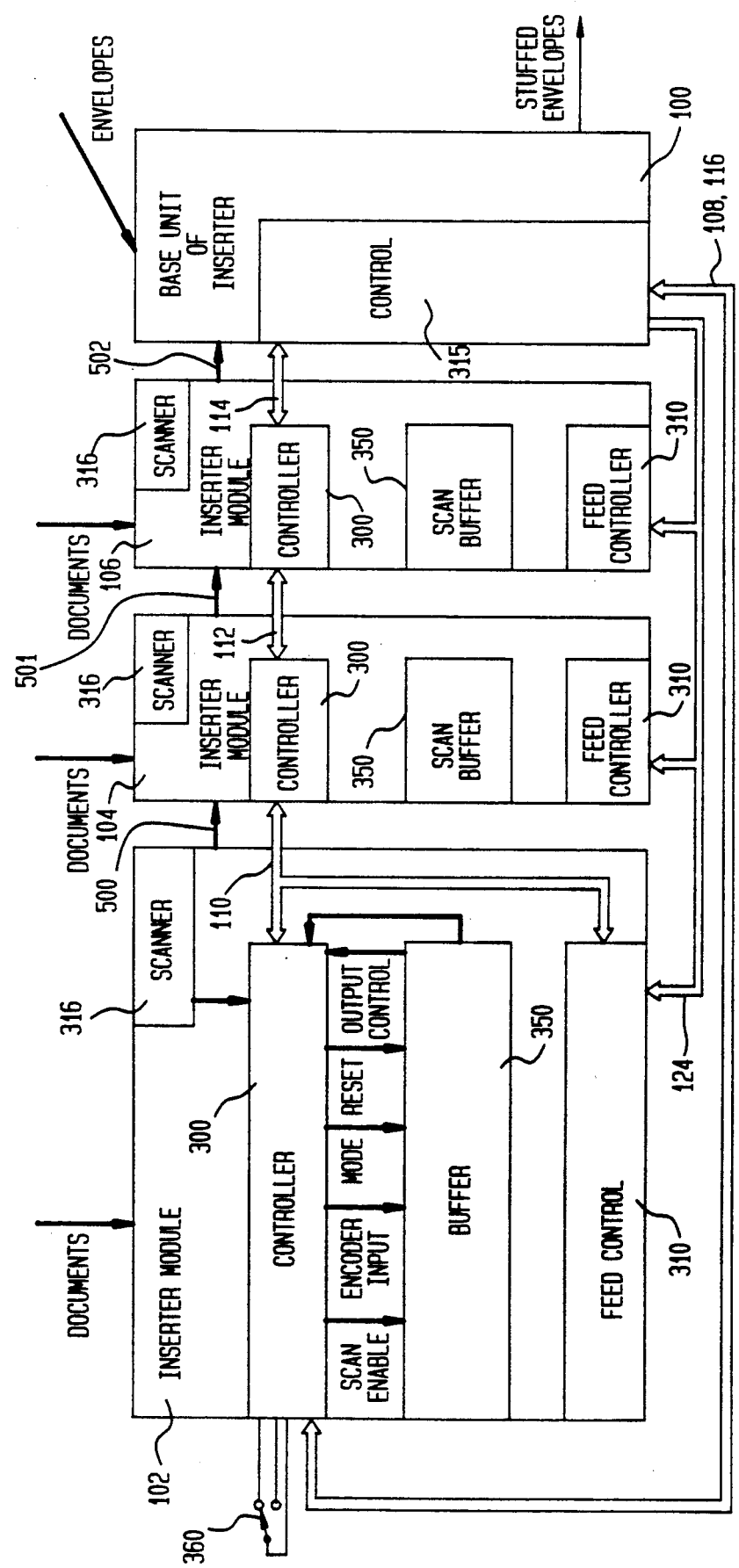
FIG. 2 is a block diagram of an inserter system adapted to employ the present invention.

Referring now to FIG. 2, an inserter system that may employ the system and method of the invention may include one or more inserter feeding modules 102, 104, 106. These modules may constitute conventional web feeding modules, such as disclosed, for example, in U.S. Pat. No. 4,707,790, or they may constitute inserter modules for feeding separate sheet inserts, documents or control documents. A conventional conveying arrangement 500, 501, 502 is provided to transport documents or stacks of documents from one module to the next, and thence to the base insertion station 100, wherein the insert documents may be stuffed into envelopes, also in conventional manner. The operation of the inserter modules 102, 104, 106 and the base insertion station is asynchronous.

The controller 300 of each module is connected and programmed to control the operations of the inserter module units via separate feed controls 310, and to cooperate with the controller 315 of the base inserter 100. It is of course apparent that either more or fewer inserter modules units may be employed than the three that are illustrated in FIG. 5.

In addition, each inserter unit module can be provided with sensors or a scanner 316, such as a photoelectric scanner, to scan control marks that may be provided on control documents or inserts fed by the respective insert module unit. The outputs of the scanners 316 are employed by the respective controller 300 to control the feeding of documents in each of the insert modules 102, 104, 106 in conventional manner.

Figure 3:
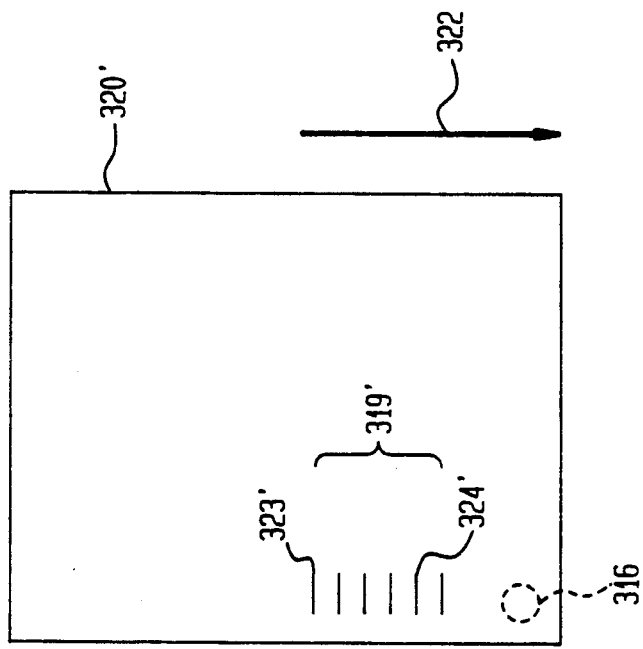
FIG. 3 is an illustration of a document with one form of control and identification marks thereon.

One example of control marks that may be employed on a document is illustrated in FIG. 3, wherein one or more dashes 319 are imprinted on a document 320 adapted to be moved by the respective inserter module unit in the direction of the arrow 322, so that the dashes can be sequentially scanned by a fixed position scan head 316. The dashes 319 include a timing registration mark or benchmark 323 located at a predetermined position on the document. It will be apparent, of course, that, instead of dashes, the marks may constitute any other conventional form of mark, such as bar codes, dots, etc.

In conventional scanning, the controller 300 enables the reading of the output of the scan head only for a given period following initiation of movement of the document, as determined by conventional means. The controller 300 may thus open a scan window of a fixed length where the scan timing registration mark or benchmark has been assigned to be located If this benchmark is detected, the scanning system re-registers itself and looks for other assigned dashes in the scan area. This system thus requires that a benchmark be detected in order to enable the scanning for any other scan data.

Following the detection of the benchmark, the scan head may detect other marks at other positions at fixed predetermined distances from the benchmark. For example, the other marks may include an End of Collation (EOC) mark 324, indicating that the current document is the last document of a given collation. Further marks on the document may correspond to other control and identification data, as is well known in the art, and hence will not be specifically discussed herein.

In the scanning of a document having control marks as illustrated in FIG. 6, it is conventional to direct the output of the scan head directly to the controller, as it is received, for processing and control of the inserting system. On occasion, however, the control and identification markings on the document may be positioned differently on the document, and/or the document may be adapted to be fed in a different direction through the inserter module unit, and/or the codification of the dashes on the document may be varied.

Figure 4:
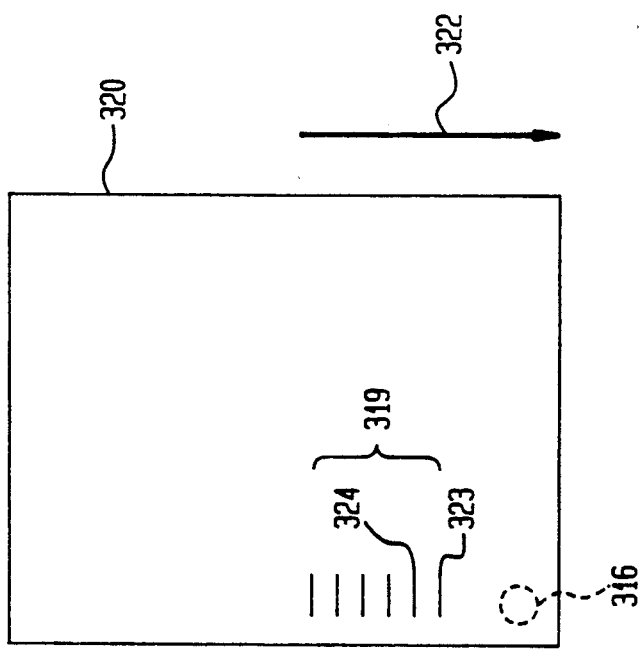
FIG. 4 is an illustration of a document with another form of control and identifications marks thereon.

For example, as illustrated in FIG. 4, the dashes may be positioned so that, if the document were moved in the same direction 322 as in FIG. 3, the Bench Mark 323' would be located at a position such that it would be scanned after the control and identification marks had been scanned. Such a document hence could not be employed in the control of the insertion system without considerable modification of the system.

It is of course apparent that the variations in the system of marks employed on the documents may include not only a changed scanning direction, as shown in FIG. 4, but also that the marks may be located on the other side of the document, they may be spaced differently, and their encoding may be different.

In accordance with the invention, the problem of feeding a document in a different direction is overcome by the provision of a scan buffer 350 in each module connected to receive and store the outputs of the respective scanner 316. The scan buffer 350 is controlled by the controller 300 to enable the storing of data in the buffer when the scan window of the scanner is positioned, relative to the document, to scan an area of the document at which scan data is assigned to be located. The scan channel information is stored in the buffer 350 using encoder pulses from the controller 300 as a clocking signal. The encoder pulses are hence merely clocking pulses that permit the storage of data resulting from the detection of marks at specific locations. The encoder pulses are also stored in the buffer 350 for use as a clocking signal during read out of the buffer. The controller 300 disables the input of the buffer 350 when the document has moved such that the scan window is no longer receiving valid scan data.

Thus, in accordance with the invention, prior to utilization of the data received from the control and identification marks 319, the data is first stored in the buffer 350.

The buffer 350 may be of conventional type wherein the scan data stored therein can be read out from the buffer in either a first-in-first-out mode, or in a last-in-first-out mode. The direction of read out of the buffer is controlled by the mode signal from the controller, and this mode signal may be in response to the operation of an operator controllable mode switch 360. Thus, the operator of the system, upon recognition of the type of scanning to be employed in a given insertion operation, may operate the switch 360, or may alternatively employ software, to control the direction in which the data is read out of the buffer 350. The switch 31 may also be employed to initialize control parameters in each controller 300 to take into consideration any further differences in the control and identification marks for a given batch of documents.

As the data is clocked out of the buffer, the system must find an active scan mark within a certain number of output clocks (which, as discussed above, are related one-to-one to the encoder clocks). If the mark is found, then the system registers itself and clocks out the remaining information as valid data. If the mark is not found, then the data that was read was not valid data. Following readout of the buffer 350, it may be reset by the controller.

After the data has been read out of the buffer it is employed in the conventional manner to control the operations of the inserter system.

While the buffer 350 has been described and illustrated as a separate component of the system, it is apparent that this has been done herein primarily in order to enable a clearer understanding of the invention. It is preferred that the buffer constitute a part of each controller 300. The controller 300 may be, for example, type 80C32 Intel microcontroller manufactured by Intel Corporation of Santa Clara, Calif. The buffer 350 may hence constitute, for example, an off chip RAM of the microcontroller, whereby the program of the microcontroller controls the enabling of the RAM to receive input data, clocking of data into and out of this RAM, and the direction that the data is read out of the RAM.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a document feeding system of the type having means for feeding one or more documents having coded marks thereon, means for detecting said marks, means coupled to receive the output of said detecting means, and means for controlling the operation of said document feeding system in response to the receipt of the output of said detecting means, the improvement wherein said means for receiving the output of said detecting means comprises buffer means, and wherein said controlling means comprises means for selectively changing the direction of read-out of data stored in said buffer means, and means for controlling said document feeding system in accordance with data read out of said buffer means.

2. The document feeding system of claim 1 wherein said means for controlling said document feeding system comprises means for controlling said document feeding system in accordance with said read-out data only after said read-out of said buffer means.

3. In an inserting system of the type having one or more modules for feeding one or more documents having coded marks thereon, each of said modules comprising means for detecting said marks and means for controlling the operation of the respective module, said inserting system further comprising means coupled to receive output signals from said detecting means corresponding to said coding and/or information marks, and means responsive to the receipt of said signals for controlling said module controlling means, the improvement wherein said means for receiving the output signals of said detecting means comprises buffer means, and wherein said controlling means comprises means for selectively changing the direction of read-out of data from said buffer means between first-in-first-out and last-in-first-out and means for controlling said inserting system in accordance with data read out of said buffer means.

4. The inserting system of claim 3 wherein said means for controlling said inserting system in accordance with data stored in said buffer means comprises means for controlling said inserting system only after said read-out of said buffer means.

5. The inserting system of claim 3 wherein said means for changing comprises operator controllable means for selectively controlling the direction of read-out of said buffer means.

6. The inserting system of claim 3 wherein said controlling means comprises means for clocking signals from said detecting means into said buffer means, and means responsive to the read-out of said buffer means for determining the validity of signals received from said buffer means.

7. A method for controlling a document feeding system of the type having means for feeding one or more documents having coded marks thereon, means for detecting said marks, means coupled to receive the output of said marks, means coupled to receive the output of said detecting means, and means for controlling the operation of said document feeding system in response to the receipt of the output of said detecting means, the improvement wherein said method comprises applying data from said detecting means to a buffer means, changing the direction of read-out of said buffer means, and controlling said document feeding system in accordance with data stored in said buffer means only after reading-out said buffer means.

8. The method of claim 7 wherein said step of changing said direction of read-out comprises changing the direction of read-out of said buffer means from first-in-first-out to last-in first-out.

9. The method claim 7 wherein said step of changing said direction of read-out comprises changing the direction read-out of said buffer means from last-in-first-out to first-in-first-out.

10. In a document feeding system of the type having a plurality of document feeding stations, each said stations having means for feeding one or more documents having coded marks thereon, means for detecting said marks, means coupled to receive the output of said detecting means, and means for controlling the operation of said document feeding system in response to the receipt of the output of said detecting means, said feeding stations including a first document feeding station coupled to feed documents to a second document feeding station, the improvement wherein said means for receiving the output of said detecting means comprises buffer means, and wherein said controlling means comprises means for selectively changing the direction of read-out of data stored in said buffer means, and means for controlling said document feeding system in accordance with data read-out of said buffer means, and wherein said first feeding station comprises means for applying data corresponding to information read by its detecting means to said second feeding station.

* * * * *